United States Patent [19]

Nakazato

[11] Patent Number: 4,541,384
[45] Date of Patent: Sep. 17, 1985

[54] SYSTEM FOR CONTROLLING THE AIR-FUEL RATIO SUPPLIED TO AN ENGINE

[75] Inventor: Kazuo Nakazato, Fuchu, Japan

[73] Assignee: Fuji Jukogyo Kabushiki Kaisha, Tokyo, Japan

[21] Appl. No.: 586,572

[22] Filed: Mar. 5, 1984

[30] Foreign Application Priority Data

Mar. 8, 1983 [JP] Japan .................................. 58-37778

[51] Int. Cl.⁴ ............................................. F02M 7/24
[52] U.S. Cl. ..................................... 123/437; 123/559; 261/121 B; 261/DIG. 51
[58] Field of Search .................. 123/437, 559; 60/601, 60/603; 261/121 B, DIG. 51

[56] References Cited

U.S. PATENT DOCUMENTS 2,070,009  2/1937  Goodman ............................. 123/437
4,241,711 12/1980  Detweiler ............................ 123/559

FOREIGN PATENT DOCUMENTS 1476208   2/1969  Fed. Rep. of Germany ... 261/121 B
55-93944  7/1980  Japan .............................. 261/121 B
55-164741 12/1980  Japan .

Primary Examiner—Andrew M. Dolinar
Attorney, Agent, or Firm—Martin A. Farber

[57] ABSTRACT

A system for controlling the air-fuel ratio for an engine comprises a valve provided in an inlet of an air bleed of a carburetor of the engine. An actuator comprises a diaphragm operatively connected to the valve and first and second chambers defined by the diaphragm. An opening is provided for communicating the first chamber with the intake passage at the upstream side of a throttle valve of the engine, and a passage is provided for communicating the second chamber with the intake passage at the downstream side of the throttle valve. The actuator is so arranged that the valve closes when the difference between the pressures in the first and second chambers exceeds a predetermined value, thereby supplying a rich air-fuel mixture.

4 Claims, 4 Drawing Figures

SYSTEM FOR CONTROLLING THE AIR-FUEL RATIO SUPPLIED TO AN ENGINE

BACKGROUND OF THE INVENTION

The present invention relates to a system for controlling the air-fuel ratio of mixture supplied to an internal combustion engine having a supercharger, for a vehicle.

An air-fuel ratio control system for an engine having a supercharger is disclosed in Japanese patent application laid open No. 55-164741, in which the air-fuel ratio is controlled by supercharging pressure. Such a system has a disadvantage that the air-fuel ratio can not be controlled to a proper value in the entire operational range of the engine, causing problems, for example, impairing driveability of the vehicle.

SUMMARY OF THE INVENTION

The object of the present invention is to provide a system which may properly control the air-fuel ratio supplied to an engine having a supercharger over the entire operating range of the engine, in which the air-fuel ratio is controlled by a valve in dependency on the difference between supercharging pressures in a passage at the upstream and downstream sides of a carburetor of the supercharged engine.

According to the present invention, there is provided a system for controlling the air-fuel ratio supplied to a combustion engine having a carburetor having a main nozzle, an air bleed communicated with the main nozzle, and a supercharger provided in an intake passage. The system comprises a valve provided in an inlet of the air bleed, an actuator comprising a diaphragm operatively connected to the valve and first and second chambers defined by said diaphragm, an opening for communicating said first chamber with the intake passage at the upstream side of a throttle valve, a passage for communicating the second chamber with the intake passage at the downstream side of the throttle valve. A check valve is provided in said first passage and a second passage communicates the first passage with the atmosphere. The actuator is so arranged that the valve closes when the difference between the pressures in the first and second chambers exceeds a predetermined value.

The above and other objects and features of this invention will be further understood from the following description with reference to the accompanying drawings.

DETAILED DESCRIPTION OF THE PREFERRED EMBODIMENT

Figure 1:
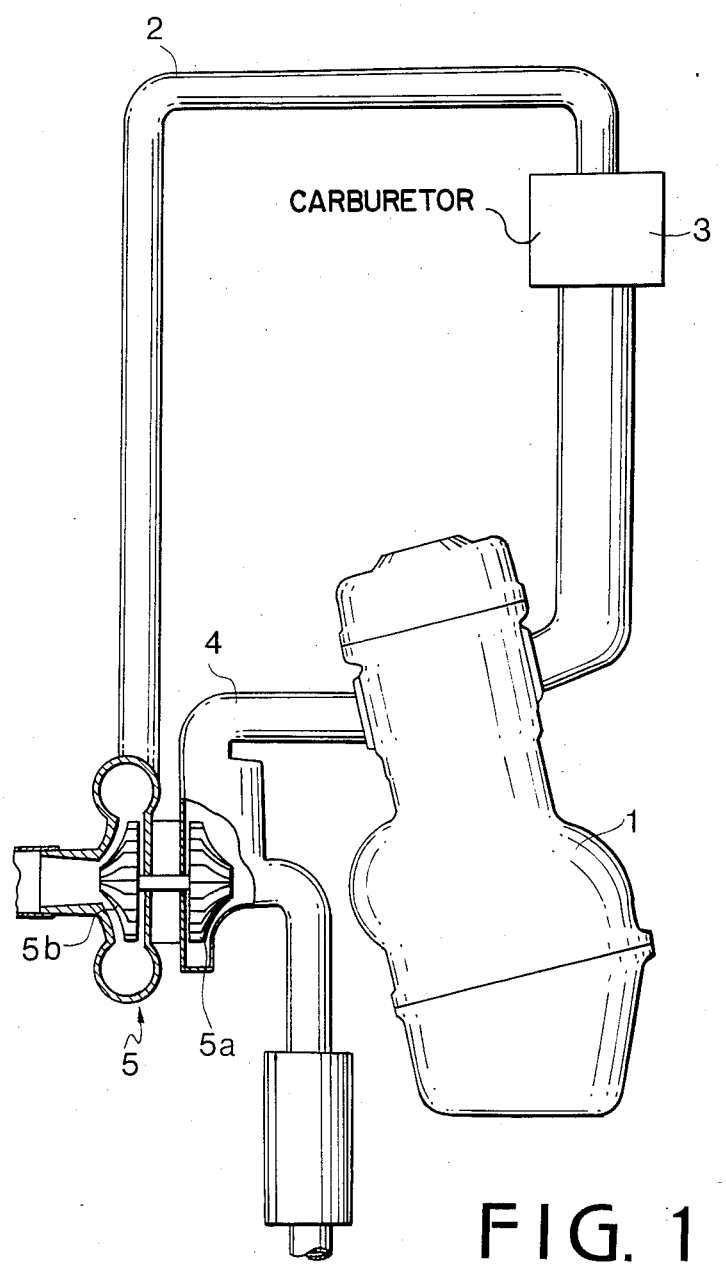
FIG. 1 is a schematic view showing a system according to the present invention.

Referring to FIG. 1, an internal combustion engine 1 is provided with an intake passage 2, a carburetor 3 provided in the intake passage 2, an exhaust passage 4 and a turbocharger 5 as a supercharger. The turbocharger 5 comprises a turbine 5a provided in the exhaust passage 4 and a compressor 5b provided in the intake passage 2.

Figure 2:
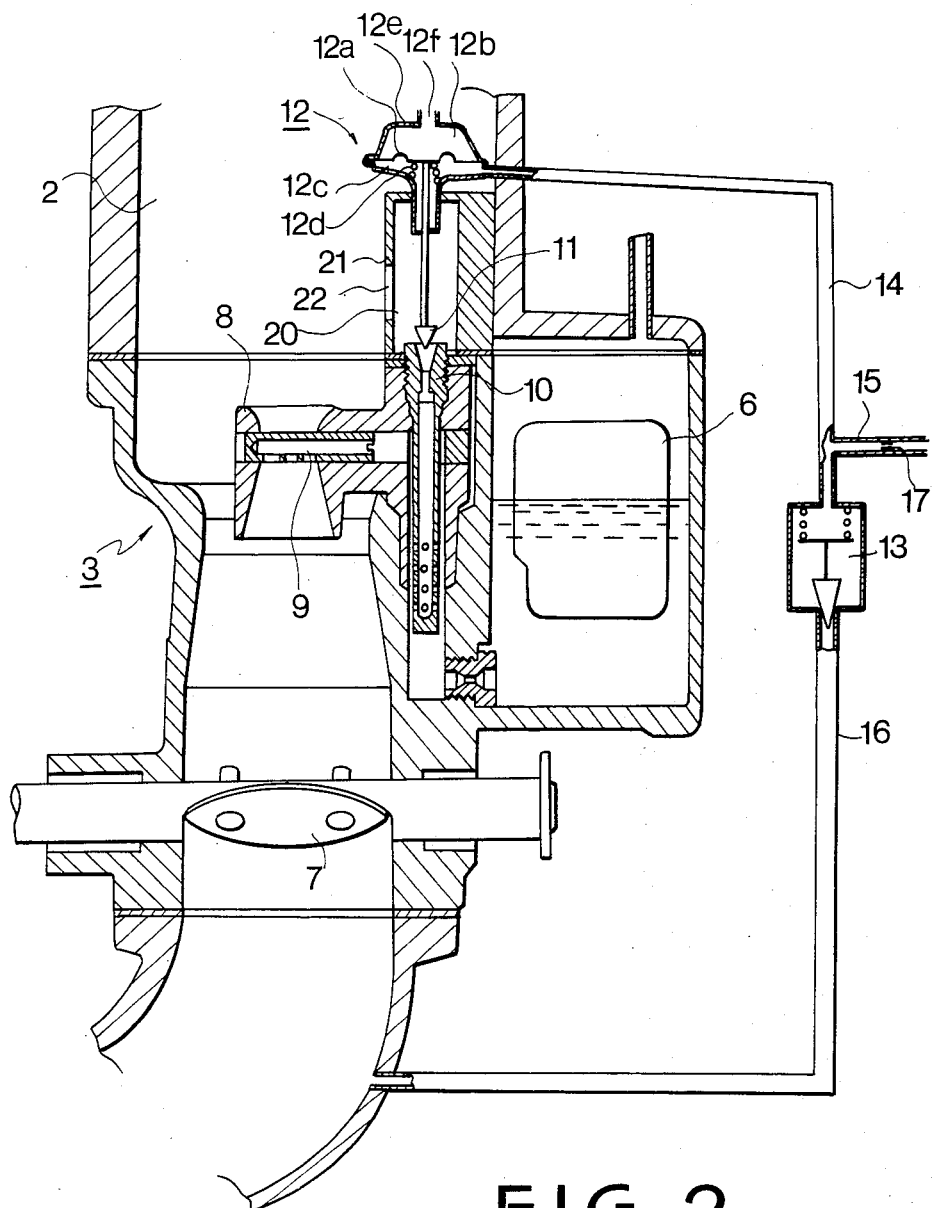
FIG. 2 is a sectional view showing a main portion of the system of FIG. 1.

Referring to FIG. 2, the carburetor 3 has a construction for the turbocharged engine, comprising a float chamber 6, a throttle valve 7 and a venturi 8 having a main nozzle 9 mounted in the intake passage 2, and an air bleed 10 communicated with the main nozzle 9. The inlet of the air bleed 10 is communicated with a chamber 20 formed by a wall 21 in the intake passage 2. The wall 21 of chamber 20 has an inlet hole 22 for communicating the chamber with the intake passage 2. In an air inlet of the air bleed, a needle valve 11 is provided. The needle valve is connected to a diaphragm 12a of an actuator 12. The actuator comprises a housing 12e secured to wall 21, a supercharging pressure chamber 12b and a pressure chamber 12c defined by the diaphragm 12a. A spring 12d biases the diaphragm 12a upwardly. The supercharging pressure chamber 12b is communicated with the intake passage by an opening 12f provided in the housing 12e. The chamber 12c is communicated with the intake passage 2 at the downstream side of the throttle valve 7 by passages 14 and 16 and an interposed check valve 13, so that the diaphragm 12a of the actuator 12 is deflected by the difference between pressures in the chambers which communicate with the intake passage at the upstream and downstream sides of the throttle valve 7. The passage 14 is communicated with the atmosphere through a passage 15 having an orifice or restrictor 17 disposed between the chamber 12c and the check valve 13.

In operation, when the supercharging pressure applied to chamber 12b through the opening 12f is higher than the summation of the pressure in the chamber 12c and the compression force of the spring 12d, the diaphragm 12a is deflected in the direction to close the needle valve 11. Accordingly, the amount of the bleed air decreases, so that the air-fuel ratio supplied by the carburetor becomes small, that is a rich air-fuel mixture is supplied. When the difference between the supercharging pressures in the intake passage at the opposite sides of the throttle valve is smaller than a predetermined value, the needle valve 11 is opened by the deflected diaphragm 12a. Thus, the amount of air passing through the air bleed 10 increases thereby supplying a lean air-fuel mixture. When the check valve 13 closes because of a low pressure at the downstream side of the throttle valve 7, the pressure in chamber 12c becomes atmospheric pressure due to its communication with the atmosphere through passage 15. Accordingly, a change operation at the time when the pressure at the downstream side of the throttle valve 7 changes from negative to positive is securely performed. The check valve 13 is provided to prevent the air in the atmosphere from entering the engine when the pressure in the passage 16 is negative.

Figure 3:
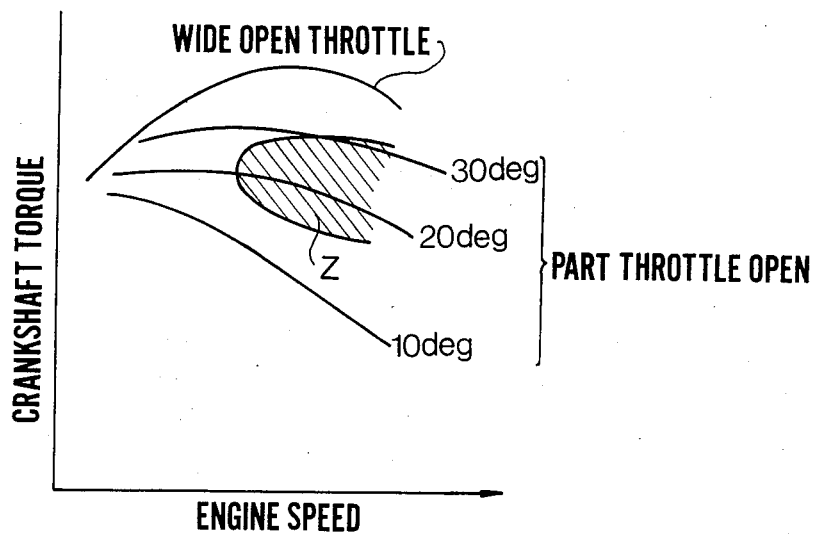
FIG. 3 is a graph showing a torque characteristics of a conventional engine.

FIG. 3 shows torque characteristics of the crankshaft of a conventional engine vs. engine speed, in which the air-fuel ratio is controlled by only supercharging pressure. In the conventional engine, when the opening degree of the throttle valve is small, the intake air is compressed at the upstream side of the throttle valve by the supercharging pressure and the compressed intake air is choked at the throttle valve 7, causing an increase of the pressure at the venturi 8. Accordingly, the pressure difference at the venturi 8 decreases. Thus the amount of fuel induced from the main nozzle 9 in the venturi decreases, which means the supply of an extremely lean air-fuel mixture. A zone Z in FIG. 3 is an extremely lean mixture zone. From the graph, it will be understood that the air-fuel ratio is not controlled to a proper value in the entire speed range of the engine.

Figure 4:
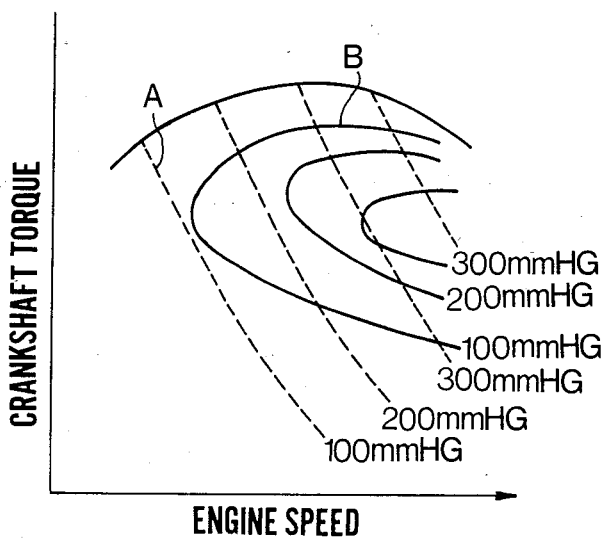
FIG. 4 is a graph showing torque characteristics of an engine according to the present invention.

In FIG. 4, reference A designates a supercharging pressure map representing the pressure at the upstream side of the throttle valve and B shows a pressure difference map between supercharging pressures at opposite sides of the throttle valve in the system of the present invention.

In the conventional system, the air-fuel ratio is controlled by the supercharging pressure represented by map A. Since the map A does not coincide with the zone Z, the lean air-fuel mixture at zone Z is not corrected. In the system of the present invention, since the pressure difference map B coincides with the zone Z, the air-fuel mixture in the zone Z is enriched.

Thus, in accordance with the present invention, the air-fuel ratio can be controlled to a proper value in the entire operational range of an engine, which contributes to fuel economy and improvement of in the driveability of vehicles.

While the presently referred embodiment of the present invention has been shown and described, it is to be understood that this disclosure is for the purpose of illustration and that various charges and modifications may be made without departing from the spirit and scope of the invention as set forth in the appended claims.

What is claimed is:

1. A system for controlling the air-fuel ratio supplied to a combustion engine having an intake passage, a carburetor having a main nozzle, an air bleed communicated with the main nozzle and a throttle valve, and an exhaust passage and a supercharger provided in the intake passage, and further comprising:
   a valve provided in an inlet of said air bleed;
   an actuator comprising a diaphragm operatively connected to said valve and first and second chambers defined by said diaphragm;
   means for communicating said first chamber with said intake passage at the upstream side of said throttle valve;
   a first passage for communicating said second chamber with said intake passage at the downstream side of said throttle valve;
   a check valve provided in said first passage;
   a second passage communicating the first passage with the atmosphere; and
   said actuator being so arranged that said valve closes when the pressure in said first chamber is higher than the pressure in said second chamber and the difference between the pressures exceeds a predetermined value.

2. The system for controlling the air-fuel ratio supplied to a combustion engine according to claim 1 wherein said inlet of said air bleed is communicated with a chamber formed by a wall in said intake passage, the chamber being communicated with the intake passage by a hole formed in the wall.

3. The system according to claim 1, wherein said second passage has an orifice.

4. The system according to claim 1, wherein said second passage communicates with said first passage at a point between said check valve and said second chamber.

* * * * *